United States Patent [19]

Perrin

[11] Patent Number: 5,583,302
[45] Date of Patent: Dec. 10, 1996

[54] REDUNDANT MASS FLOW METER

[75] Inventor: Jean-Paul Perrin, Vert Saint Denis, France

[73] Assignee: Societe Nationale d'Etude et de Construction de Motors d'Aviation "Snecma", Paris, France

[21] Appl. No.: 494,226

[22] Filed: Jun. 23, 1995

[30] Foreign Application Priority Data

Jun. 30, 1994 [FR] France ............... 94 08057

[51] Int. Cl.⁶ ........................................... G01F 1/78
[52] U.S. Cl. ........................................ 73/861.351
[58] Field of Search .................. 73/861.35, 861.36, 73/861.37, 861.33, 861.77

[56] References Cited

U.S. PATENT DOCUMENTS

| | | | |
|---|---|---|---|
| 2,814,949 | 12/1957 | Bodge | 73/861.36 |
| 3,036,462 | 4/1962 | Levins | 73/861.36 |
| 3,538,767 | 11/1970 | Pustell et al. | 73/861.35 |
| 4,056,976 | 11/1977 | Hildebrand et al. | 73/861.35 |
| 4,248,099 | 2/1981 | Allen, Jr. et al. | 73/861.36 |
| 4,438,648 | 3/1984 | Cheney, Jr. | 73/861.35 |

FOREIGN PATENT DOCUMENTS

| | | |
|---|---|---|
| 0101804 | 3/1984 | European Pat. Off. |
| 1284647 | 12/1968 | Germany |
| 1423864 | 4/1969 | Germany |
| 2242743 | 10/1991 | United Kingdom |

*Primary Examiner*—Richard Chilcot
*Assistant Examiner*—Max H. Noori
*Attorney, Agent, or Firm*—Oblon, Spivak, McClelland, Maier & Neustadt, P.C.

[57] ABSTRACT

A redundant mass flow meter comprises a casing housing a main rotor and an intermediate rotor which is freely rotatable and is disposed coaxially with a rotationally restricted turbine between the turbine and the casing, a first measuring system for measuring and controlling the position of the turbine relative to the intermediate rotor, and a second measuring system, independent of the first measuring system, for measuring and controlling the position of the intermediate rotor relative to the casing.

9 Claims, 2 Drawing Sheets

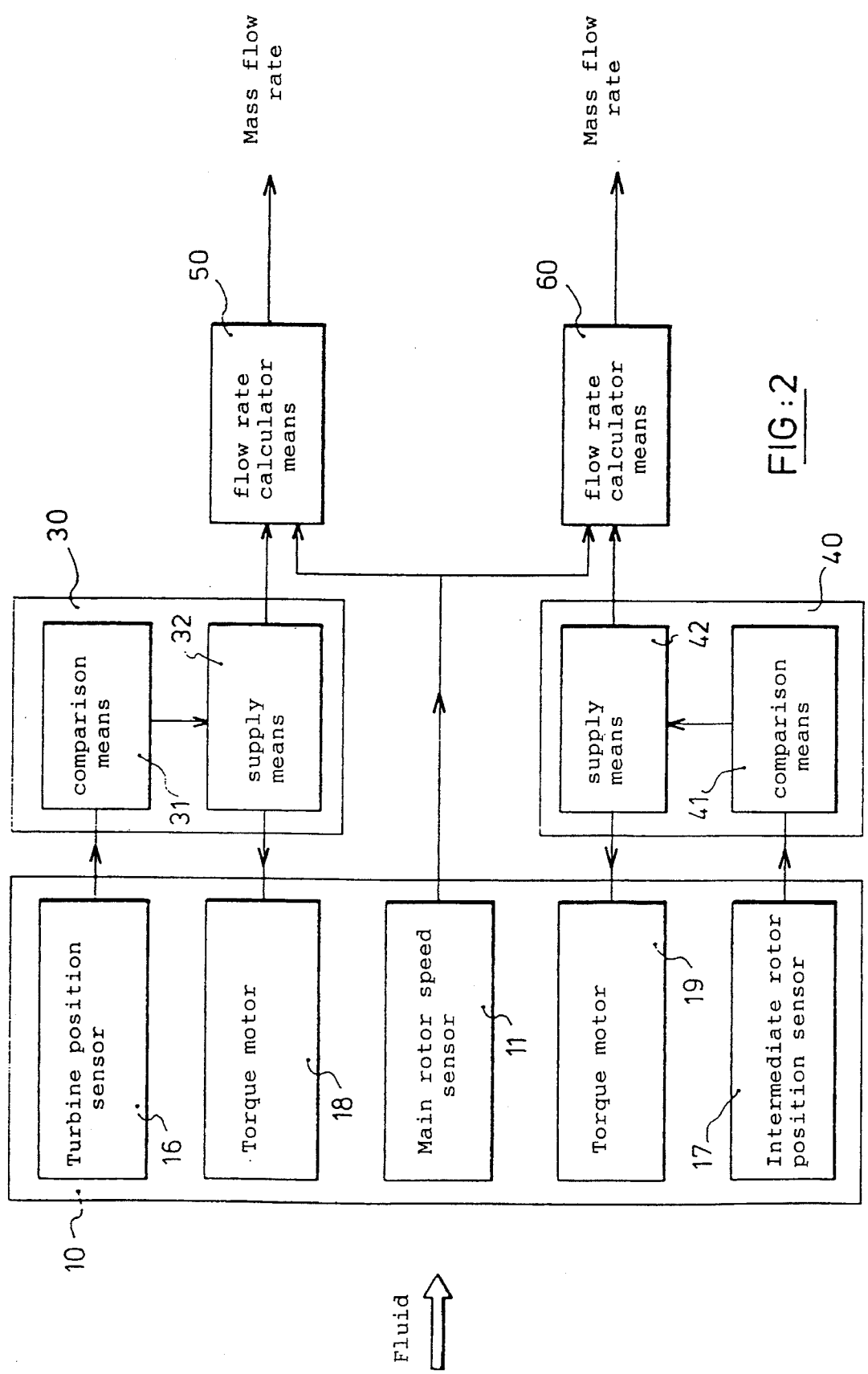
FIG:2

REDUNDANT MASS FLOW METER

BACKGROUND OF THE INVENTION

1. Field of the Invention

The invention relates to a totally redundant mass flow meter, and is particularly applicable to the measurement of the flow of a fluid in an electronic control system in a turbomachine.

2. Summary of the Prior Art

In order to measure the mass flow rate of a fluid, it is known to use a flow meter comprising a casing in which there is an axial passage for the flow of a fluid propelled at a constant angular velocity, a rotor which is caused to rotate by the fluid or an electric motor, and a rotationally restricted turbine on which the fluid exerts a torque proportional to the product of the mass flow rate of the fluid and the angular velocity of the fluid. The value of the torque is measured by controlling the position of the turbine by means of a limited movement torque motor and an angular position sensor. Measurement of the current which supplies the torque motor makes it possible to calculate the torque acting on the turbine and to deduce from it the mass flow rate of the fluid. Such a flow meter is described in U.S. Pat. No. 4,056,976.

It is also known to provide a partially redundant flow meter by disposing on the turbine two measurement systems each comprising a torque motor and a position sensor. However, the two measuring systems are not independent and cannot function simultaneously because it is not possible to apply two restoring torques to the turbine at the same time. These two systems can only be used alternately; switching from one system to the other being effected in the event of a breakdown in one of the measuring systems. However, in numerical control where it is necessary to compare two different measurements carried out by two measurement systems for fault probability or detection tests, the two measurements must be carried out simultaneously.

SUMMARY OF THE INVENTION

The aim of the invention is to alleviate the drawbacks of known mass flow meters and provide a totally redundant mass flow meter comprising two measuring systems which are totally independent electrically and which function simultaneously in such a way as to obtain two simultaneous and independent measurements of the torque exerted on the turbine, enabling two measurements to be deduced representing the mass flow rate of the fluid.

To this end, according to the invention there is provided a mass flow meter comprising a casing, a main rotor mounted within the casing for rotation about an axis, means for measuring the rotational speed of the main rotor, a rotationally restricted turbine mounted in the casing spaced axially from the main rotor, at least one rotationally free intermediate rotor mounted coaxially with the turbine between the casing and the turbine, first means for measuring the position of the turbine relative to the intermediate rotor, second means for measuring the position of the intermediate rotor relative to the casing, first means for controlling the position of the turbine relative to the intermediate rotor, and second means for controlling the position of the intermediate rotor relative to the casing.

A first measuring system is constituted by the first position measuring means and the first position controlling means, and a second measuring system, independent of the first measuring system, is constituted by the second position measuring means and the second position controlling means.

In a first embodiment of the invention, the position controlling means of the two measuring systems are two independent torque motors mounted concentrically on the intermediate rotor, and the position measuring means of the two measuring systems are two independent position sensors mounted concentrically on the intermediate rotor.

In a second embodiment of the invention, the position controlling means belonging to one measuring system and the position measuring means belonging to the other are mounted concentrically on the intermediate rotor.

The absolute values of the restoring torques exerted by the two position controlling torque motors respectively on the turbine and on the intermediate rotor are equal to the absolute value of the torque exerted on the turbine by the fluid. Measurement of the two currents which respectively supply the two torque motors makes it possible to obtain two simultaneous and independent measurements of the mass flow rate of the fluid.

Further preferred features and advantages of the invention will become apparent from the following description of the preferred embodiments, given by way of example only, with reference to the appended drawings.

BRIEF DESCRIPTION OF THE DRAWINGS

FIG. 2 shows diagrammatically one example of two loops for controlling the positions of the turbine and the intermediate rotor in a flow meter according to the invention; and, FIG. 3 shows a partial cross-sectional view through a second embodiment of a flow meter in accordance with the invention.

DESCRIPTION OF THE PREFERRED EMBODIMENTS

Figure 1:
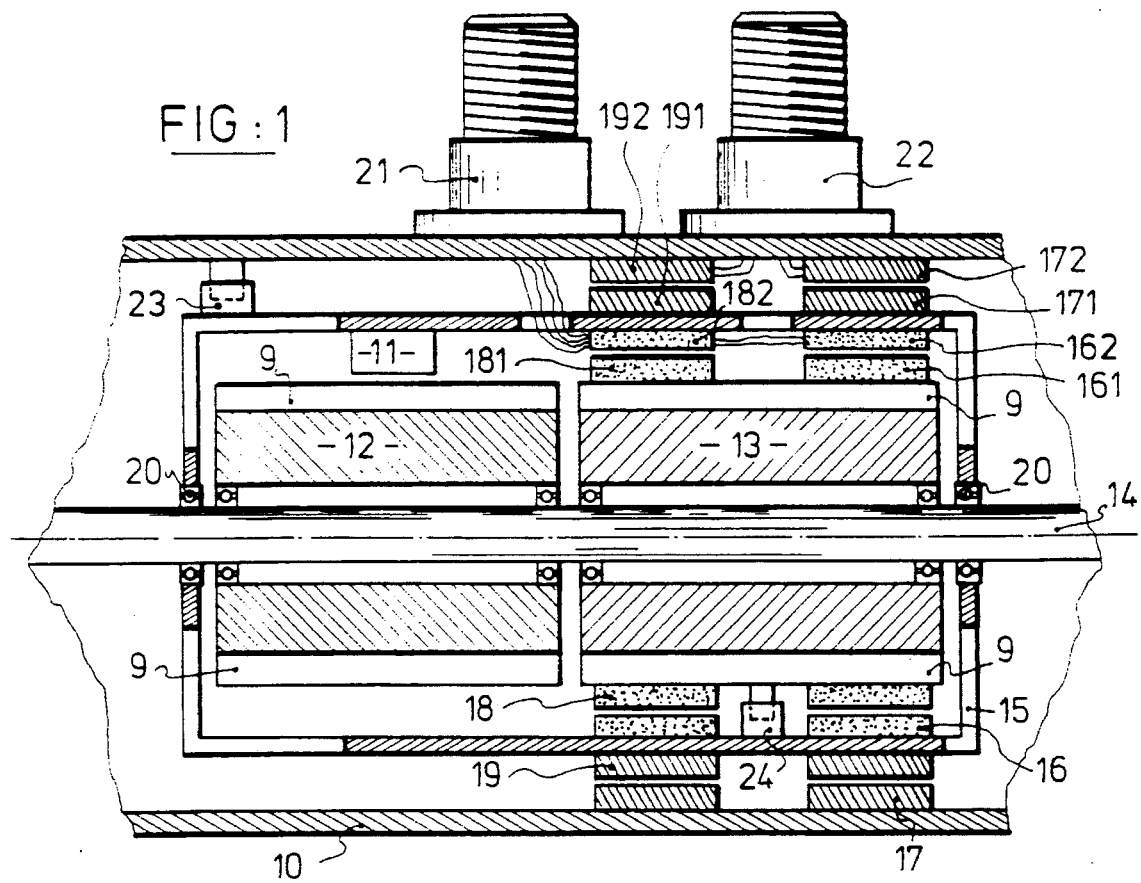
FIG. 1 shows a partial cross-sectional view through a first embodiment of a totally redundant flow meter in accordance with the invention.

In the first embodiment shown in FIG. 1, the flow meter comprises a casing 10 within which are located a main rotor 12 arranged to rotate freely on a shaft 14, a turbine 13 which is permitted restricted rotation and is spaced axially from the main rotor 12 along the shaft 14, the main rotor 12 and the turbine 13 both being provided with fins 9, and an intermediate rotor 15 arranged to rotate freely about the shaft 14 and disposed coaxially with the turbine 13 between the casing 10 and the turbine 13. The flow meter further comprises sensor means 11 for measuring the speed of rotation of the main rotor 12, first means 16 for measuring the angular position of the turbine 13 relative to the intermediate rotor 15, second means 17 for measuring the angular position of the intermediate rotor 15 relative to the casing 10, first means 18 for controlling the position of the turbine 13 relative to the intermediate rotor 15, and second means 19 for controlling the position of the intermediate rotor 15 relative to the casing 10. The angular movement range of the turbine is less than 20°. The main rotor 12, the turbine 13 and the intermediate rotor 15 are mounted on the shaft 14 by means of bearings 20, and the turbine 13 is located inside the intermediate rotor 15. The main rotor 12 may be located outside the intermediate rotor 15 or inside it as shown in FIG. 1. The sensor means 11 for detecting the rotational speed of the main rotor 12 may be fixed on the casing 10 or on the intermediate rotor 15 when the main rotor is located inside the intermediate rotor.

The first and second position measuring means 16, 17 are position sensors mounted concentrically on the intermediate rotor 15. The first and second control means 18, 19 are torque motors mounted concentrically on the intermediate rotor 15. By way of example, position sensors and torque motors of the type known by the name "PANCAKE" having a large diameter, and a hollow disc-shaped rotor may be used.

The torque motor 18 and the position sensor 16 belong to a first measuring channel and are connected to a first connector 21 fixed on the outside wall of the casing 10. They each comprise a rotor element 181, 161 fixed on the turbine 13 and a stator element 182, 162 fixed on the intermediate rotor 15.

The torque motor 19 and the position sensor 17 belong to a second measuring channel and are connected to a second connector 22 fixed on the outside wall of the casing 10. They each comprise a rotor element 191, 171 fixed on the intermediate rotor 15 and a stator element 192, 172 fixed on the casing 10.

The positional control of the turbine and the intermediate rotor is achieved by means of two conventional control loops described below with reference to FIG. 2.

The flow meter operates as follows. A fluid whose flow rate is to be determined passes through the main rotor 12, emerging from it with a certain amount of angular motion, and then passes through the rotationally restricted turbine 13, on which it exerts a torque which is proportional to the product of the mass flow rate of the fluid and the angular velocity of the fluid. The flow of the fluid occurs on the one hand between the intermediate rotor and the main rotor followed by the turbine, and on the other hand between the casing and the intermediate rotor.

The main rotor 12 may be rotatably driven by an auxiliary electric motor (not shown) or by the fluid itself. In the case where the main rotor is driven by the fluid itself, the fluid is previously set in motion, for example by means of a vortex generator (not shown), in such a way as to be propelled at a constant angular velocity. The angular velocity of the main rotor is equal to that of the fluid and is measured by the speed sensor 11.

The torque motor 18 and the position sensor 16 ensure control of the position of the turbine 13 relative to the intermediate rotor 15 by applying to the turbine a torque of a value equal to and in a direction opposite to the torque exerted by the fluid. The two actions exerted on the turbine by the fluid and by the torque motor 18 are intended to immobilise the turbine in a reference position, the position of the turbine being measured by the position sensor 16. The intermediate rotor is then subjected by means of the torque motor 18 to a torque which is equal and opposite to that exerted on the turbine. The intermediate rotor, which is able to turn freely, is positionally controlled relative to the casing 10 by means of the torque motor 19 and the position sensor 17 applying to it a torque which is equal and opposite to that exerted on the turbine by the torque motor 18. The absolute values of the torques exerted by the torque motors 18, 19 are equal to the absolute value of the torque exerted on the turbine by the fluid. The two torque motors 18, 19 therefore draw currents of a strength proportional to the mass flow rate of the fluid. Simultaneous measurement of the strength of these currents and knowledge of the angular velocity of the fluid as determined by the speed sensor 11 therefore make it possible to obtain two simultaneous measurements of the mass flow rate of the fluid.

Preferably, mechanical stops 23, 24 are disposed between the casing and the intermediate rotor and between the intermediate rotor and the turbine in such a way as to limit the angular displacement of the intermediate rotor 15 in relation to the turbine 13 and to the casing 10 in the event of a breakdown of one of the torque motors. Thus, in the event of a breakdown of the torque motor 18 so that positional control of the turbine is no longer provided, the turbine will be displaced rotationally as far as the stops and, by means of these stops, will then drive the intermediate rotor with it. Positional control of the intermediate rotor relative to the casing continues to be carried out by the torque motor 19 and the position sensor 17 so that the second measuring channel remains functional and makes it possible to obtain a measurement of the mass flow rate of the fluid. In the case of a breakdown in the torque motor 19, positional control of the intermediate rotor is no longer provided but positional control of the turbine continues to be performed by means of the torque motor 18 and the position sensor 16. The first measuring channel therefore remains functional and makes it possible to obtain a measurement of the mass flow rate of the fluid.

Only a double breakdown of a torque motor belonging to one of the measuring channels and a position sensor belonging to the other measuring channel, or a double and simultaneous breakdown of the two torque motors gives rise to a loss of measurement of the fluid flow rate. Such instances of a double breakdown are very rare.

FIG. 2 shows a block diagram of two loops for automatically controlling the positions of the turbine and the intermediate rotor. The two measuring channels of the flow meter are independent and are respectively connected by the two connectors 21, 22 to two devices 30, 40 for processing signals delivered by the position sensors 16, 17 and for supplying the torque motors 18, 19. Each processing device 30, 40 comprises a means 31, 41 for comparing the signal received from the respective position sensor 16, 17 with a reference position, and means 32, 42 for supplying the respective torque motor 18, 19.

The supply means 32, 42 are respectively controlled by the comparison means 31, 41, and each delivers an electric current applied on the one hand to the corresponding torque motor 18, 19 and on the other hand to calculating means 50, 60. These two calculating means 50, 60 also receive a signal from the sensor 11 which detects the speed of the main rotor, and deliver at their outlet two simultaneous and independent measurements of the mass flow rate of fluid.

Figure 3:
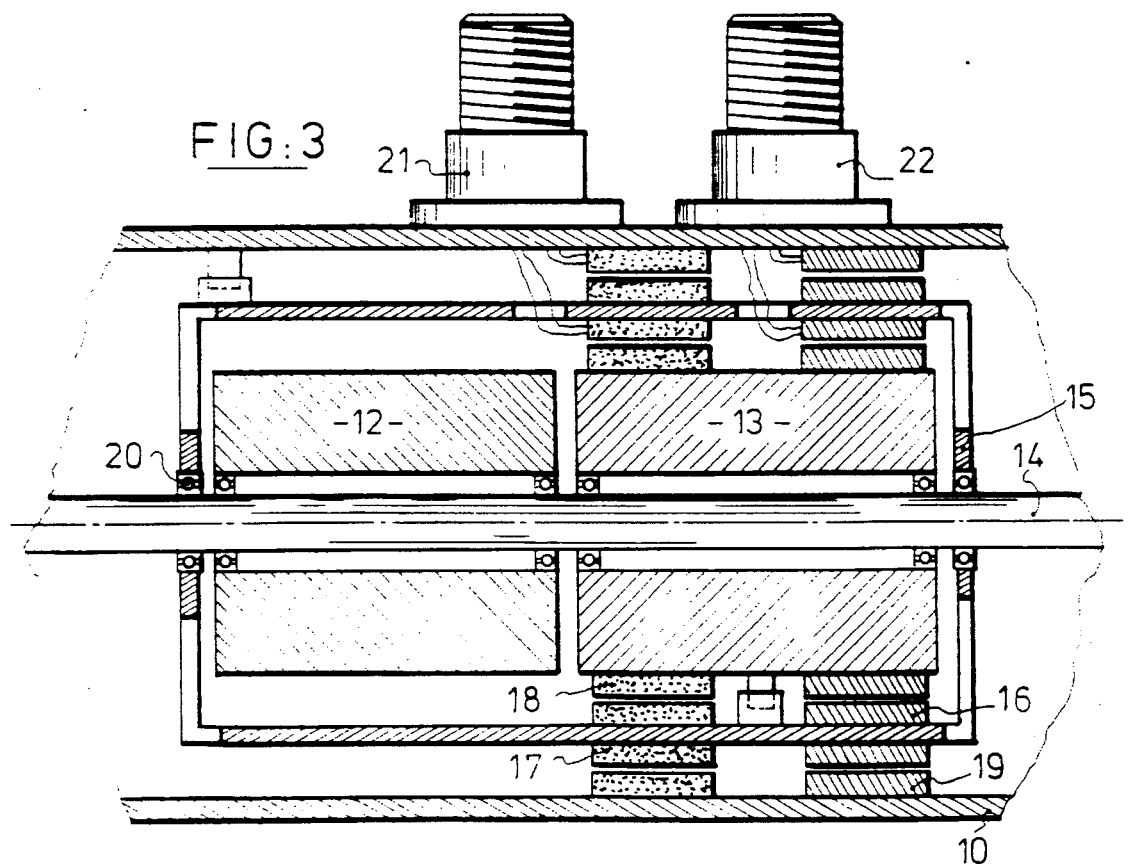

In the second embodiment shown in FIG. 3 the disposition of the torque motors and the position sensors is changed in relation to the first embodiment. In this case the torque motor 18 belonging to the first measuring channel for controlling the position of the turbine 13 relative to the intermediate rotor 15 and the position sensor 17 belonging to the second measuring channel are mounted concentrically on the intermediate rotor 15. Likewise, the torque motor 19 belonging to the second measuring channel for controlling the position of the intermediate rotor 15 relative to the casing 10 and the position sensor 16 belonging to the first measuring channel are mounted concentrically on the intermediate rotor 15.

This arrangement makes it possible to separate the motors of the two measuring channels on a mechanical plane and thereby reduce the problems of interference or successive breakdowns due, for instance, to over-heating. As the motors are no longer concentric heating is less localised, which improves their reliability.

It will of course be understood that the invention is not confined to the embodiments which have been described herein. For example, it is possible to obtain additional measuring channels by using a plurality of concentric intermediate rotors associated with means for measuring and controlling the position of each intermediate rotor.

I claim:

1. A mass flow meter comprising a casing, a main rotor acted on by a fluid flow mounted within said casing for rotation about an axis, means for measuring the rotational speed of said main rotor, a rotationally restricted turbine mounted in said casing spaced axially from said main rotor, at least one rotationally free intermediate rotor acted on by the same fluid flow as said main rotor mounted coaxially with said turbine between said casing and said turbine, first means for measuring the position of said turbine relative to said intermediate rotor, second means for measuring the position of said intermediate rotor relative to said casing, first means for controlling the position of said turbine relative to said intermediate rotor, and second means for controlling the position of said intermediate rotor relative to said casing, wherein said first means for controlling and said second means for controlling redundantly supply outputs indicative of mass flow rates.

2. A mass flow meter according to claim 1, having a common shaft on which said main rotor, said turbine and said intermediate rotor are all mounted.

3. A mass flow meter according to claim 1, wherein said first and second position measuring means are first and second position sensors mounted concentrically on said intermediate rotor.

4. A mass flow meter according to claim 3, wherein said first and second position controlling means are first and second torque motors mounted concentrically on said intermediate rotor.

5. A mass flow meter according to claim 4, wherein said first torque motor and said first position sensor each comprise a rotor element fixed on said turbine and a stator element fixed on said intermediate rotor.

6. A mass flow meter according to claim 4, wherein said second torque motor and said second position sensor each comprise a rotor element fixed on said intermediate rotor and a stator element fixed on said casing.

7. A mass flow meter according to claim 1, including mechanical stops disposed between said casing and said intermediate rotor and between said intermediate rotor and said turbine.

8. A mass flow meter according to claim 1, wherein said first position measuring means and said second position controlling means are mounted concentrically on said intermediate rotor.

9. A mass flow meter according to claim 8, wherein said second position measuring means and said first position controlling means are mounted concentrically on said intermediate rotor.

* * * * *

UNITED STATES PATENT AND TRADEMARK OFFICE
CERTIFICATE OF CORRECTION

PATENT NO. : 5,583,302
DATED : December 10, 1996
INVENTOR(S) : PERRIN

It is certified that error appears in the above-indentified patent and that said Letters Patent is hereby corrected as shown below:

Title Page, section [73], change "Societe Nationale d'Etude et de Construction de Motors d'Aviation "Snecma", Paris, France" to --Societe Nationale d'Etude et de Construction de Moteurs d'Aviation "Snecma", Paris, France--.

In column 1, line 58, change "between-the" to --between the--.

Signed and Sealed this

Eighth Day of July, 1997

*Attest:*

BRUCE LEHMAN

*Attesting Officer*    *Commissioner of Patents and Trademarks*